June 12, 1945. M. DE YOUNG 2,378,066
GRINDING MACHINE CONTROL
Filed May 1, 1944 8 Sheets-Sheet 1

Inventor
Martin De Young
By Liverance &
Van Antwerp
Attorneys

Inventor
Martin De Young

Inventor
Martin De Young
By- Liverance and
Van Antwerp
Attorneys

June 12, 1945. M. DE YOUNG 2,378,066
GRINDING MACHINE CONTROL
Filed May 1, 1944 8 Sheets-Sheet 5

Inventor
Martin De Young
By Liverance and
Van Antwerp
Attorneys

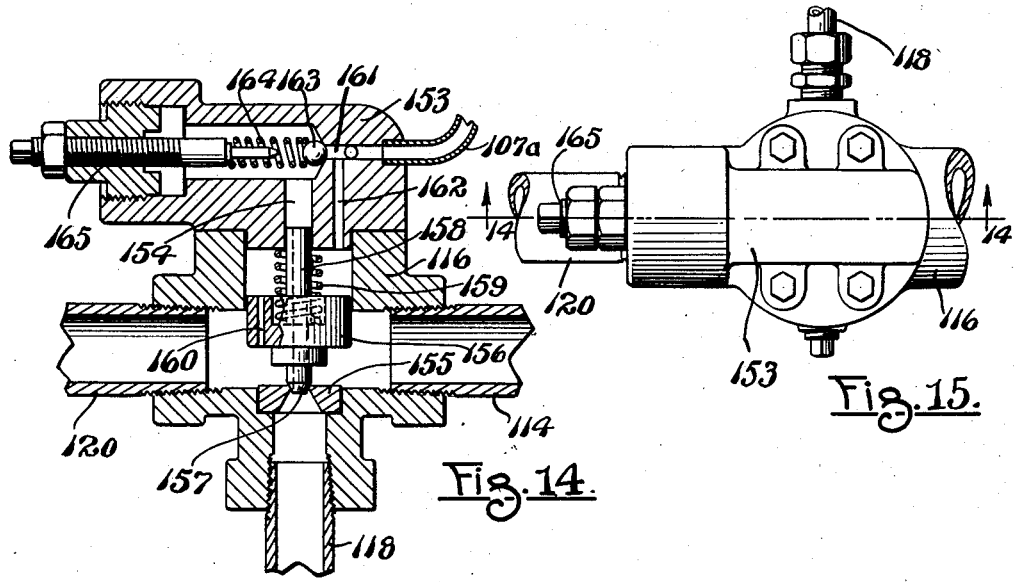
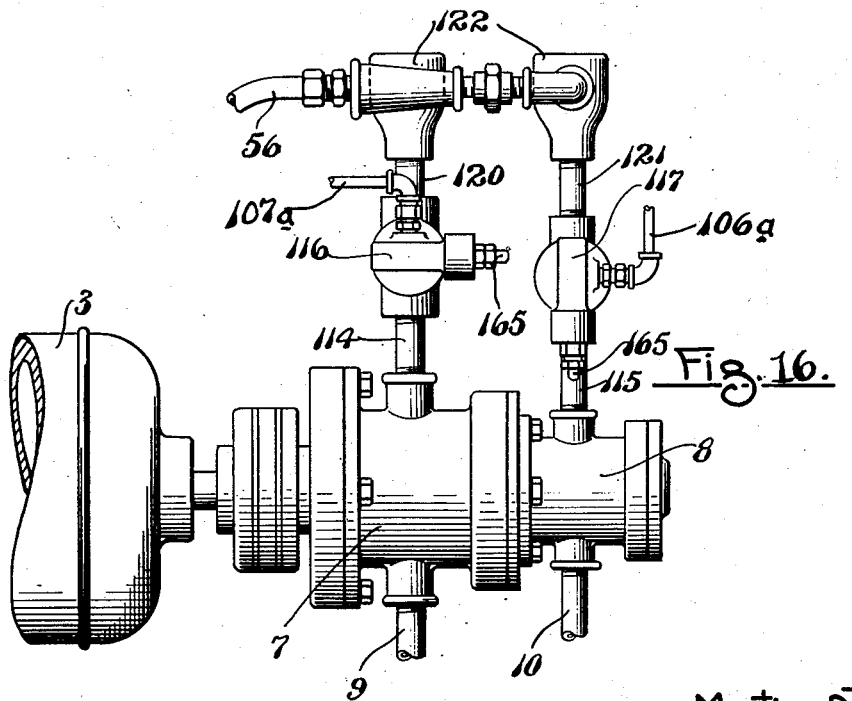

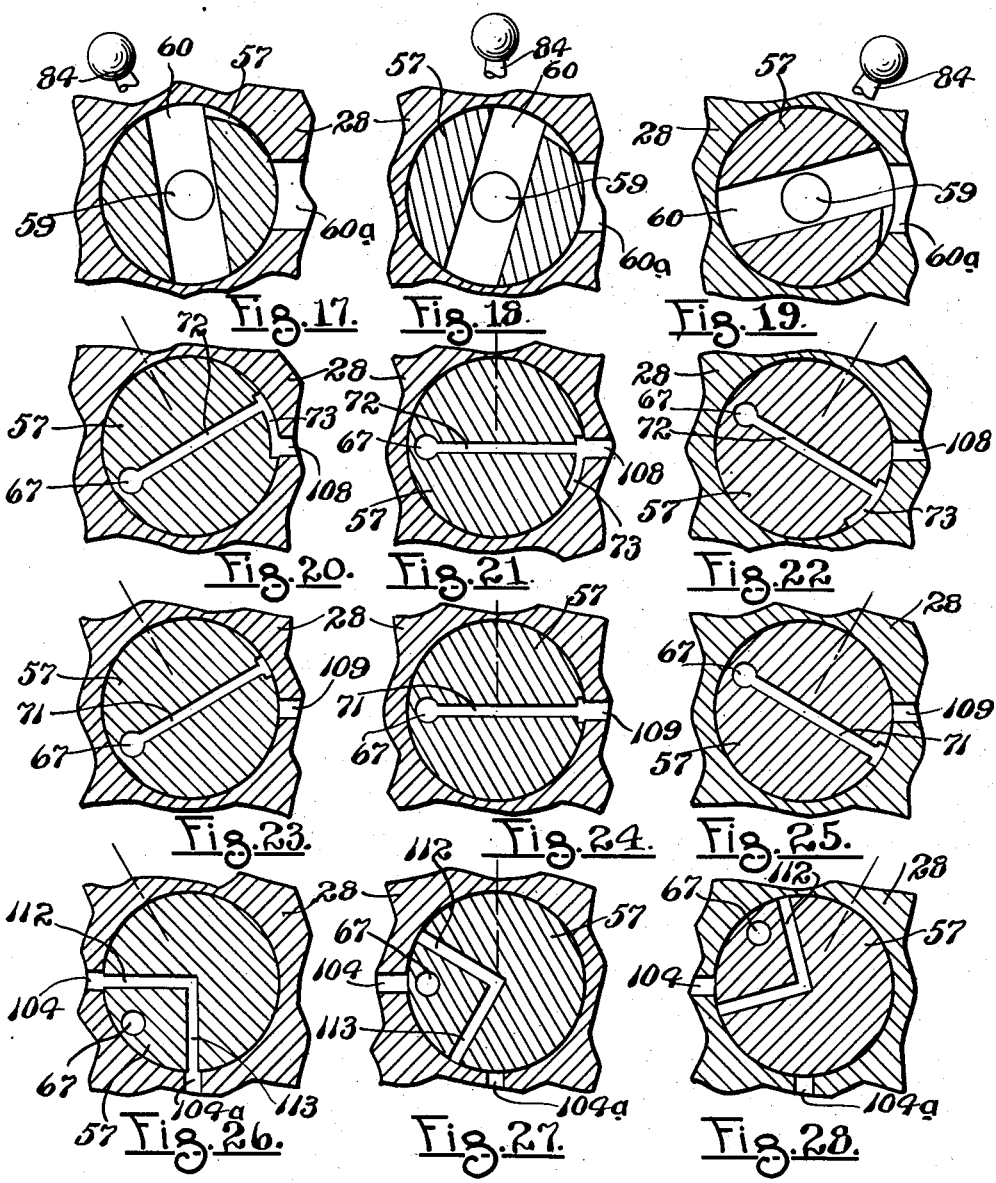

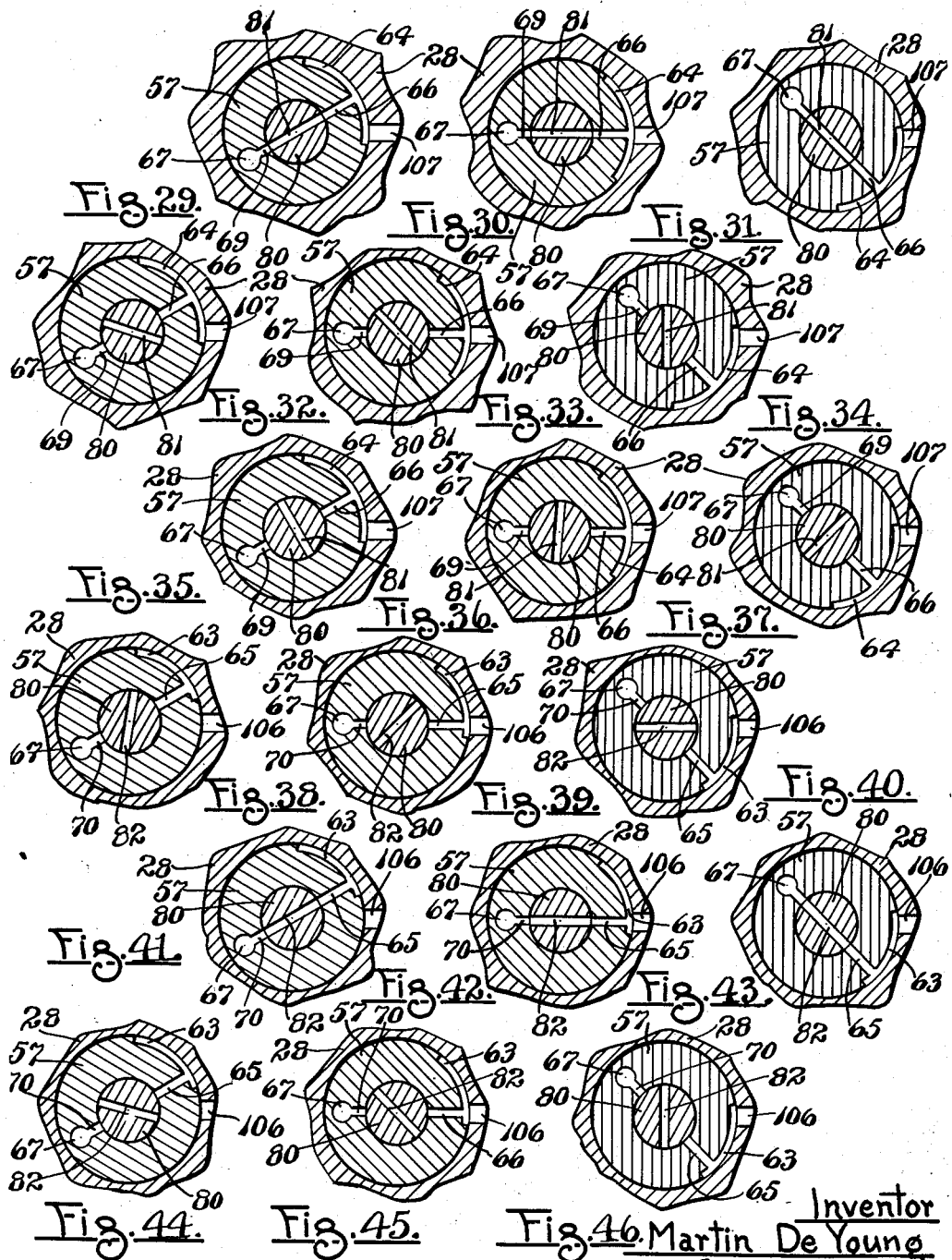

Patented June 12, 1945

2,378,066

UNITED STATES PATENT OFFICE 2,378,066

GRINDING MACHINE CONTROL

Martin De Young, Grand Rapids, Mich., assignor to Gallmeyer & Livingston Company, Grand Rapids, Mich., a corporation of Michigan Application May 1, 1944, Serial No. 533,480

10 Claims. (Cl. 51—233)

This invention relates to a novel hydraulic control of grinding machines and more especially to surface grinding machines.

In surface grinding machines of the character to which the present invention may be applied, a horizontal work carrying table is mounted for reciprocation to move work which is to be ground back and forth underneath a rotating grinding wheel; and the grinding wheel is mounted and carried so that it may be moved across the table in step by step movements between passages of the work underneath, the grinding wheel thereby grinding the entire surface of the work carried by the table. Also such transverse bodily movement of the grinding wheel is desirably, a continuous reciprocatory movement at the times that the working surface of the wheel is dressed.

In the present invention, the reciprocation of the table and the transverse step by step or reciprocatory continuous movement of the grinding wheel mount and carriage therefor are effected hydraulically by means of piston cylinder arrangements connected therewith, and the invention is more particularly directed to a simple hydraulic control of the speed of table movements and extent of grinding wheel feed movements for the many and varying conditions of work to be performed.

In connection with the reciprocatory movement of the work carrying table the speed of movement is subject to wide variation under different conditions of work, that is, substantially all variations of speed from a maximum downward to immediately before the table is brought to a stop. In the hydraulic operation of the work carrying table the quantity of hydraulic liquid required is greater with increases in speed. With my invention two pumps are used to pump the hydraulic liquid under pressure and the control provides for supplying the hydraulic pressure liquid in greater or lesser amounts from the pumps or from either of the pumps as selected.

Further with my invention such control, of manual character, is located centrally directly at the front of the machine and immediately available to the operator of the machine, and with it the two pumps, which are motor driven, may selectively hydraulically individually reciprocate the table or work holder and/or selectively individually advance or retract the grinding wheel head. Furthermore, the pumps may be controlled for a selective operation in unison, to provide the same pressure as though each were individually operated and control the rapidity of the longitudinal movement of the table or of the cross feed of the grinding wheel.

An understanding of the invention and of a machine embodying it may be had from the following description, taken in connection with the accompanying drawings, in which, Fig. 1 is a vertical section through a grinding machine to which my invention is applied showing in general the location of the control valve means.

Fig. 14 is a fragmentary vertical section substantially on the plane of line 14—14 of Fig. 15.

Fig. 15 is a plan view of the relief valve structure, shown in section in Fig. 14, for controlling the delivery of hydraulic pressure to the table and grinding wheel piston cylinder structures, one of said relief valves being used in conjunction with each of the pumps used.

Fig. 16 is a fragmentary elevation showing the rotary hydraulic pumps and their connection in alinement to a motor, the inlet and delivery outlets thereto and associated relief and check valves.

Figs. 17, 18 and 19 are transverse sections through the inner end portion of the cylindrical valve control member shown in Fig. 4, at three different positions thereof in connection with the housing in which mounted, the section plane being at the passage indicated at 80 in said Fig. 4.

Figures 4, 5:
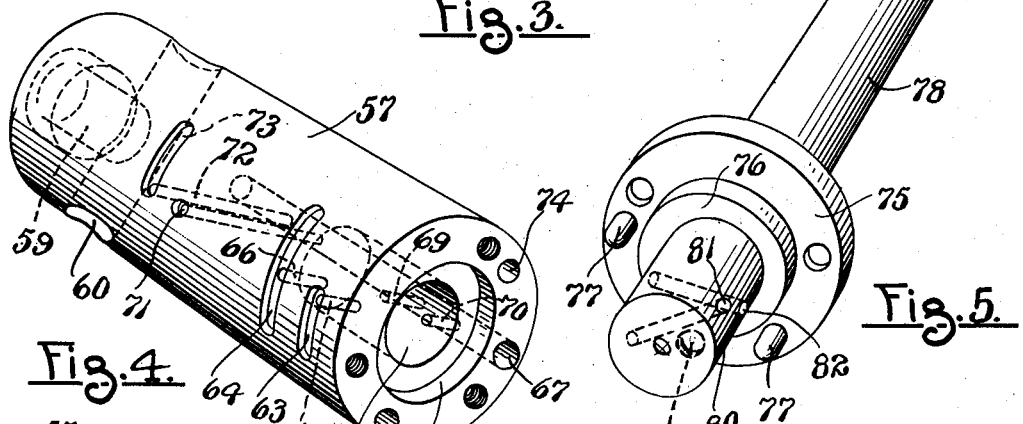
Figs. 4 and 5 are perspective views of the two immediate manually operable valve control members which are mounted at the front and substantially centrally of the length of the grinding machine.

Figs. 20, 21, and 22 are similar transverse sections showing three different positions of said valve, said transverse sections being taken a short distance outward from the section shown in Figs. 17, 18 and 19, or in the plane of the passage indicated at 72 in Fig. 4.

Figs. 23, 24 and 25 are like sections showing the valve in three different positions, the section through the valve being taken at the passage 71 of Fig. 4.

Figure 6:
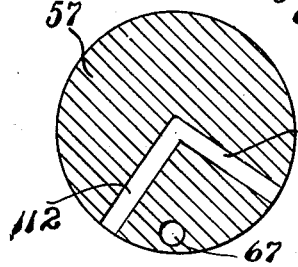
Fig. 6 is a transverse vertical section through the valve member shown in Fig. 4 at a point approximately midway between the ends thereof.

Figs. 26, 27 and 28 are similar transverse sections showing three different positions of said valve, the plane of the section being at the passages 112, 113 through said valve, shown in Fig. 6.

Figs. 29 to 37 inclusive are fragmentary transverse sections showing nine operative relative positions of the valves of Figs. 4 and 5 to each other when assembled, and to their enclosing housing, the plane of said section being at the passages 66 and 69 of the valve in Fig. 4 and at the passage 81 of Fig. 5, and Figs. 38 to 46 inclusive are like sections of said valves in nine different relative positions to each other and to their enclosing housing, the plane of said section being at the passages 65 and 70 in the valve of Fig. 4 and at the passage 82 of the valve of Fig. 5.

Like reference characters refer to like parts in the different figures of the drawings.

In a surface grinding machine to which my invention is applicable a vertical support 1 is provided with a base 2 above and upon which an electric motor 3 for driving the hydraulic pumps is mounted. At the front lower portion of the vertical support 1 a work table supporting housing 4 is provided, having a base 5 over which a tank 6 for containing supply of the hydraulic liquid, usually oil, is placed. The pumps 7 and 8 of different sizes and capacities are connected to the shaft of the motor 3 and extend over the tank 6. Said pumps 7 and 8 are provided with intake pipes 9 and 10 to extend into the liquid within the tank. As shown the pump 7 is of a larger capacity than the pump 8.

The reciprocating work carrying table 11 of the grinding machine lies over suitable ways 12 and 13 at the upper side of the supporting housing 4 and has complementary ways 14 and 15 engaging with the ways 12 and 13 in the usual manner.

The grinding wheel 16 mounted to turn upon a horizontal axis is connected with the shaft 17 of a driving motor 18. The shaft of the grinding wheel 16 has a telescoping splined connection with the shaft of the motor and said wheel and its shaft are carried by a housing 19 mounted for movement transversely of the table 11, the hood 20 over the grinding wheel 16 moving with the housing 19 and with the grinding wheel.

Figure 1:
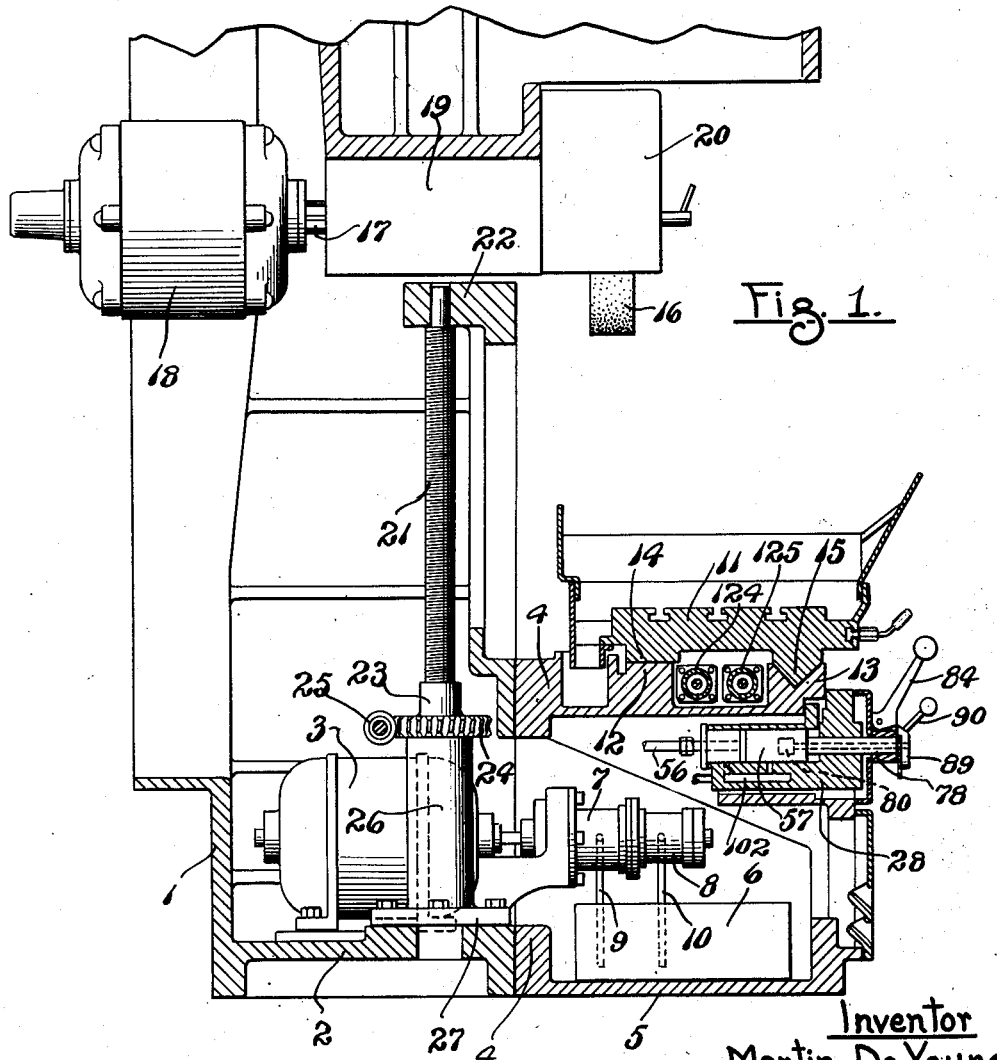

The vertical adjustment of the grinding wheel 16 its motor and the parts of the grinding machine which carries the housing 19 is effected by a vertical screw 21 mounted at its upper end on a frame part 22 and passing at its lower portion through an interiorly threaded sleeve 23 which has a worm wheel 24 thereon to be driven by worm 25 from any suitable source of power, such as an electric motor. The worm wheel 24 is located at the upper end of a hollow sleeve or column 26 connected by its base 27 to the base 2, the lower end portion of the screw 21 being received within said sleeve upon its downward movement. It is of course to be understood that the detail of the machine for the vertical adjustment of the grinding wheel with respect to the reciprocating table 11 and the work carried thereon does not appear as such construction is old and well known and forms no part of the present invention; and that as in Fig. 1, there is shown primarily the environment in general in which my invention is applied.

Figure 2:
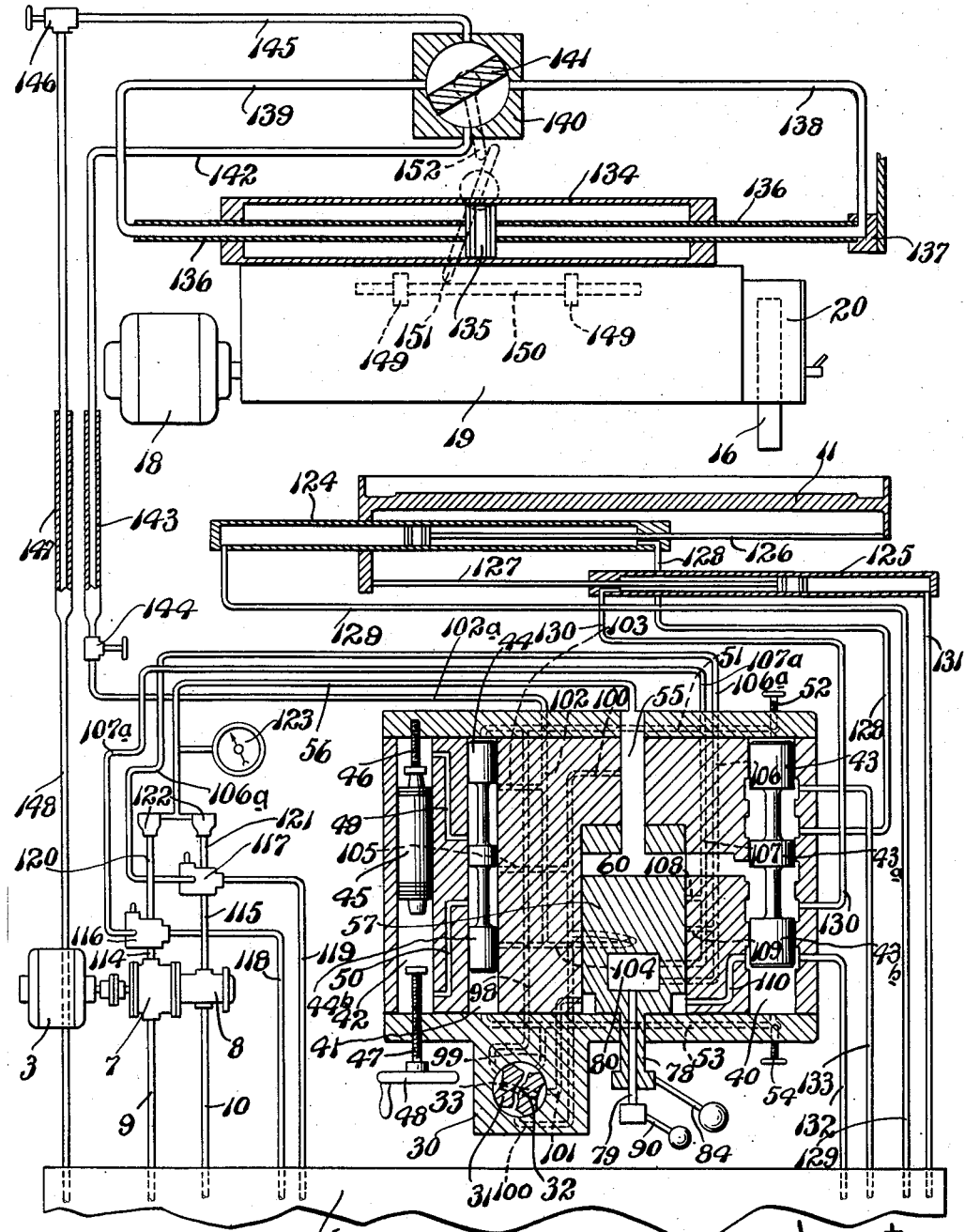
Fig. 2 is a diagrammatic view illustrative of the hydraulic circuits of the machine and with the parts in the position which they have during one of the reciprocatory movements of the work holding table.
Figure 3:
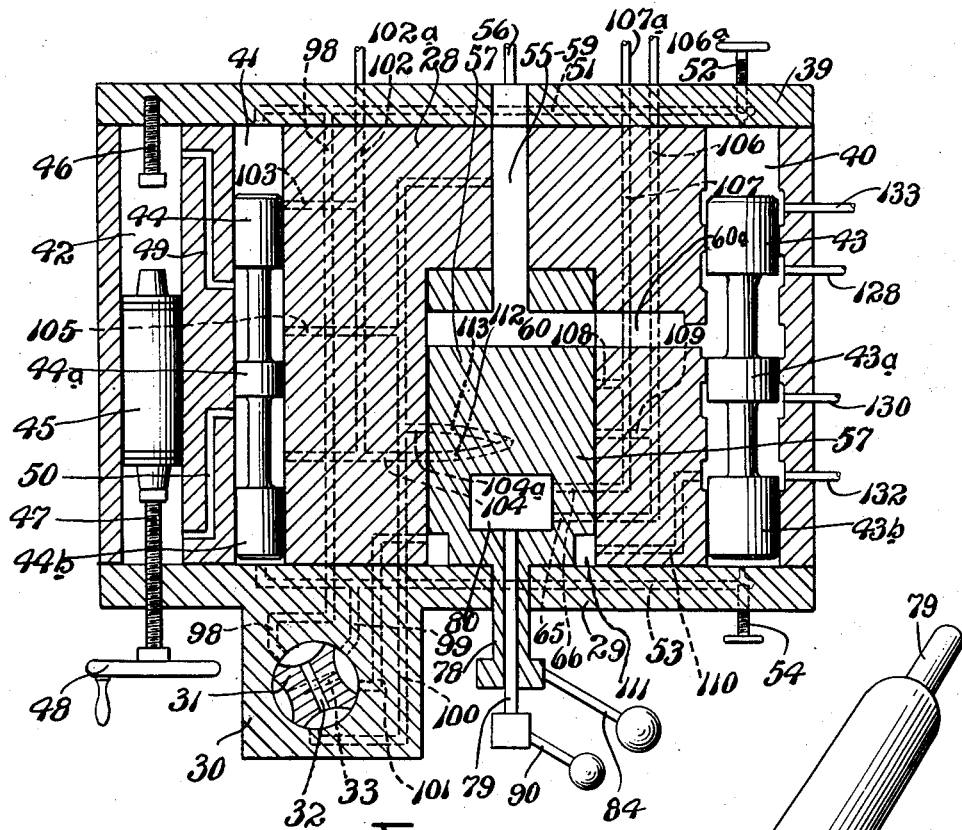
Fig. 3 is a somewhat enlarged diagram of the immediate control valve structure with the parts in the position when the reciprocation of the work holding table is reversed from that in Fig. 2.

The manually operable mechanism for controlling the volume and passage of the hydraulic liquid under pressure is located at the front of the machine below the table 11. It includes a statutory valve block or housing 28 permanently secured at the upper front portion of and within the housing 4 (Fig. 7), at the front of which a plate 29 is permanently secured to be in effect integral therewith and which has a forwardly projecting enlargement 30 indicated in Fig. 3. In the lower portion of the enlargement 30 a valve 31 is mounted to turn about a vertical axis which has two transverse passages 32 and 33 through it located at right angles to each other, the valve being cut away at its sides at the ends of said passages (Fig. 3). A vertical stem 34 extends through and above the enlargement 30 and has a sleeve 35 (Fig. 7) secured at its upper end portion from which a handle 36 for hand operation extends forwardly, and also a lug 37. The lug 37 extends into the path of movement of fingers 38, two of which spaced from each other are adjustably secured at the front side and lower portion of the table 11, being adjustable through a T-shaped slot at the front side of the table with bolts located in said slot and passing through the fingers 38 to receive tightening nuts at their outer ends. It is apparent that when the fingers 38 engage the lug 37 in the movement of the table when it is approaching an end of predetermined reciprocatory movement the valve is swung from one position, as shown in Fig. 2, to another, as shown in Fig. 3 and vice versa, the effect of which, as will later be described, is to cause a reversal of movement of the table. The length of movement of the table is controlled by the adjusted positions of the Figures 38.

Figure 7:
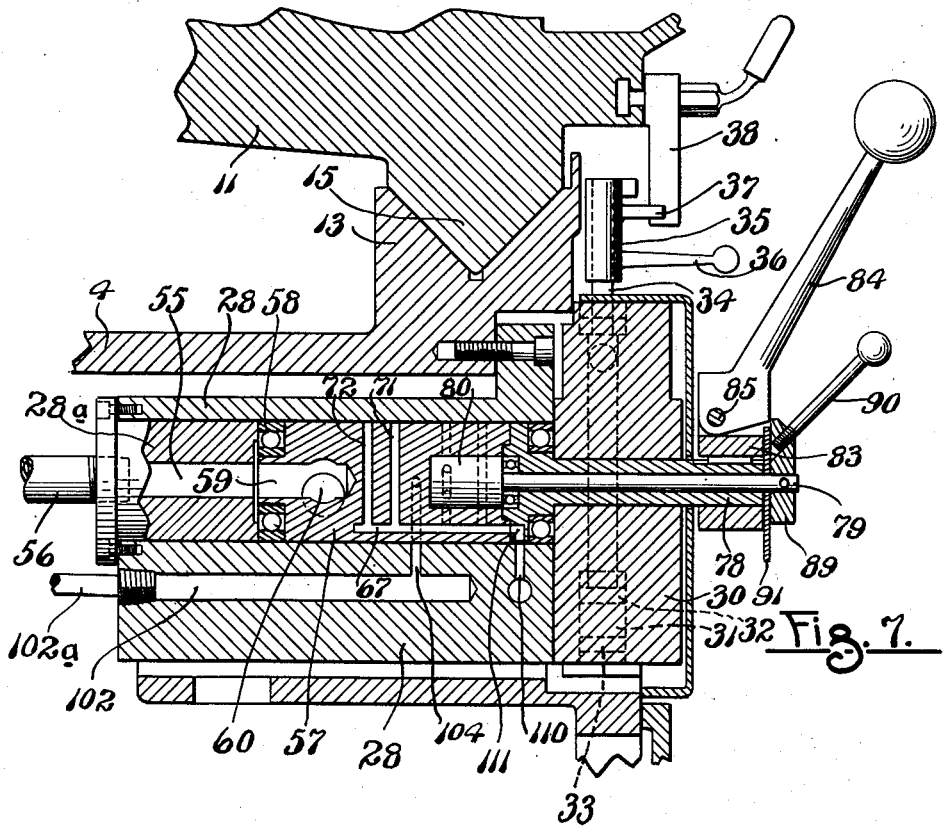
Fig. 7 is an enlarged fragmentary vertical section through the immediate control valve mechanism at the front of the machine.

Diagrammatically, as in Figs. 2 and 3, at the back of the housing block 28 is a closure plate 39 which in practice is made up of a plurality of closing disks and plates, one of which is shown in Fig. 7, but in effect being the same as a single plate. Within the block, from front to rear, and between the front and rear closures are three cylinders 40, 41 and 42 (Figs. 2 and 3). In the cylinder 40 a piston is mounted having three piston sections 43, 43a and 43b separated from each other. In the cylinder 41 a somewhat similar piston is mounted having three sections 44, 44a and 44b similarly spaced from each other, one piston section being at the middle and the other two at the ends. The overall length of both pistons is less than the lengths of the cylinders 40 and 41 in which they are mounted. In the third cylinder 42 a piston 45 is mounted which is movable between the head of a screw 46 located at the rear end of the cylinder and the head of an adjustable screw 47 at the front and passing through the front plate 29, being provided with a hand wheel 48 for adjustment to control the extent of movement of the piston 45 between the heads of the two screws 46 and 47. Passages 49 and 50 shown in the diagram in Fig. 3 connect the rear and front end portions of the cylinder 42 with the intermediate portion of the cylinder 41 as shown. The rear ends of cylinders 40 and 41 are connected by a conduit or passage indicated at 51 and a screw 52 is directed into the passage 51 to control the rate of flow of liquid which can move through such passage to the cylinder 40 at the rear end thereof. A similar conduit or passage 53 connects the front ends of the cylinders 40 and 41, and a like control screw 54 through the plate 29 controls the rate of flow of liquid which can move through such passage to the front end of the cylinder 40.

The block or housing 28 is bored toward its upper side from front to rear to receive the cylindrical valve members hereinafter described, the boring being partially filled at its rear end by a cylindrical block 28a which in effect is the same as integral with the block 28, and in the diagrammatic views (Figs. 2 and 3) is not separately indicated but is as though integral with said block 28. The separate building of the cylindrical block 28a is for facility in machining and assembly. The cylindrical block 28a has an axial passage 55 through it which is in communication with a pressure liquid carrying pipe or conduit 56 at its rear end.

The immediate control valve structure includes two parts. One of them at 57 (Fig. 4) is introduced into the bore to come against the cylindrical block 28a and between them a ball bearing or the like, as indicated at 58, may be placed. The rear end portion of the valve 57 is axially bored as at 59 for a portion of its length, the passages 55 and 59 being in axial alinement and at the forward end of the passage 59 the cylindrical valve member 57 is transversely bored to make the passage 60 through it.

At its front end the cylindrical valve member 57 (Fig. 4) is machined to make a relatively shallow cylindrical recess 61 and a deeper cylindrical recess 62 of less diameter which extends into the valve member 57 toward but short of the passage at 59. The axis of the cylindrical recess 62 is coincident with the axis of the valve member 57. Two grooves 63 and 64 are machined in the outer curved surface of the valve 57 at one side thereof, groove 64 being substantially twice the length of the groove at 63. From one end of the groove 63 a radial passage 65 connects it with the interior cylindrical recess 62 and from substantially the middle of the groove 64 a like radial passage 66 connects it with said cylindrical recess 62. The groove 63 and its associated radial passage 65 is forward of the groove 64 and its passage 66.

Toward one side of the cylindrical valve member 57 and diametrically opposite the passages 65 and 66 a longitudinal opening 67 is bored into the valve member from its outer end substantially to the plane of the inner end of the passage 59. Radial passages 69 and 70 connect the passage at 67 with the cylindrical recess at 62 and are in diametric alinement, respectively, with the passages 66 and 65 previously described. Toward the inner end of the passage 67 two additional spaced apart passages 71 and 72 are drilled or bored through the body of the valve member 57, the one at the rear or farthest inward at 72 at its outer end connecting with one end of a groove 73 similar to the grooves 64 and 65 cut in the outer cylindrical surface of the member 57. Said passages 71 and 72 are parallel to each other and are located back of the cylindrical recess at 62 and have their outer ends at the same side of said member 57 as the passages 65 and 66 as shown.

At the front end of the member 57 two locating holes 74 are bored for the proper location of a flange 75 thereagainst and which is provided with a short cylindrical boss 76 received within the shallow cylindrical recess 61, locating pins 77 on the flange entering the holes 74. The flange 75 is permanently connected at the front of the member 57 by means of screws passing into screw threaded openings shown in the valve 57. An elongated sleeve 78 is integral with flange 75 and extends forwardly therefrom through which a rod 79 axially passes, extending beyond the end of the sleeve at its front end, and at its rear end carrying a cylindrical valve member 80 which is received within the recess at 62. The flange 75 has an opening 67a through it which when the parts are assembled and connected together is in conjunction with the passage 67.

The valve member 80 has two diametrically disposed passages 81 and 82 transversely therethrough spaced from each other and angularly disposed to each other and located so that when the two valve members are assembled as described the innermost passage 81 in the assembled structure, upon a certain relative position of two valve members 80 and 57 to each other comes into conjunction at its ends with the passages 66 and 69; and at another relative position of said valve members the other passage 82 at its ends comes into conjunction with the inner ends of the passages 65 and 70.

Figure 12:
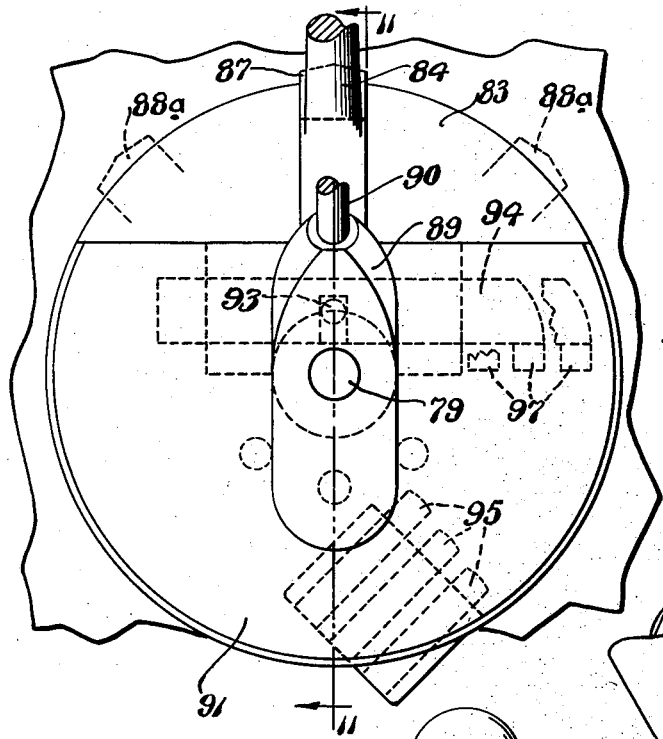
Fig. 12 is a fragmentary enlarged front elevation thereof.
Figure 11:
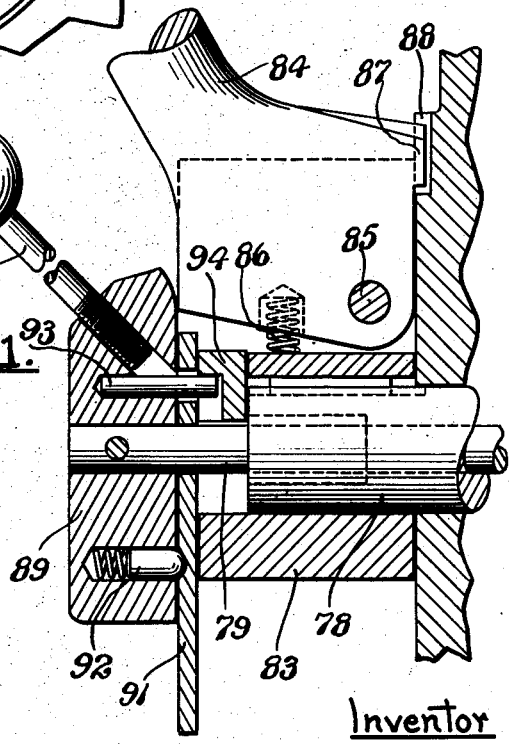
Fig. 11 is an enlarged vertical section substantially on the plane of line 11—11 of Fig. 12 at the front of the machine and illustrating the immediate structure and mounting of said hand control levers.

The sleeve 78 extends in front of the front plate 29 and the rod 79 extends in front of the front end of said sleeve (Fig. 11). A collar 83 is keyed on the sleeve 78 and at its upper side is slotted to receive the lower end portion of an operating lever 84 pivotally mounted at 85 and normally acted upon by a spring 86 tending to turn it in a clockwise direction to bring a lug 87 on the lever into a vertical recess 88 made in the face of the machine over which the lever is movable between and portions 88a whereby the lever 84 may occupy one of three positions, a central vertical position as in Figs. 9 and 12, an adjustable position to the left of the central position as in Fig. 8 or an adjustable position to the right thereof as in Fig. 10; and it may also occupy positions between. It is evident that when the lever 84 is moved from any of such positions in which it may be located to either of the two remaining positions the valve 57 is correspondingly turned about its axis.

Figures 8, 9, 10:
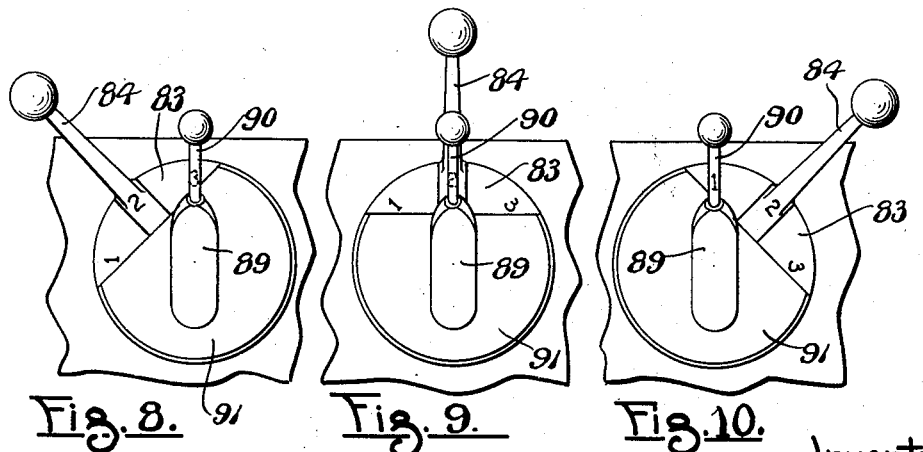
Figs. 8, 9 and 10 are fragmentary front elevations showing different relative positions of the hand levers to each other, which hand levers are connected to the two valve members shown in Figs. 4 and 5 for turning them about their longitudinal axes.

At the front end of the rod 79 a block 89 is pinned (Fig. 11) from which a manually operable lever 90 extends upwardly and forwardly. The block 89 is separated from the collar 83 by a plate 91 fixed on collar 83 and turnable about the axis of rod 79 in the face of which concave recesses are made for the reception of a spring actuated bullet catch 92 carried by block 89, which catch may ride over the face of the plate 91. As indicated in dotted lines in Fig. 12, there are three of these recesses for the reception of the catch 92 whereby the lever 90 and block 89 are normally moved to any selected one of three positions. It is of course to be understood that the larger lever 84 may be moved to positions between the three normal positions indicated. The central position of the lever 90 is shown in Figs. 8 to 10 inclusive, but such lever is movable to a position to the left and to another position to the right of such central position. The two levers 84 and 90 are independently movable but in practice when the lever 84 is moved to any position the lever 90 always moves with it, and each lever 90 has its movements in relation to the lever 84 and not to the machine, while lever 84 moves relative to the machine.

Figure 13:
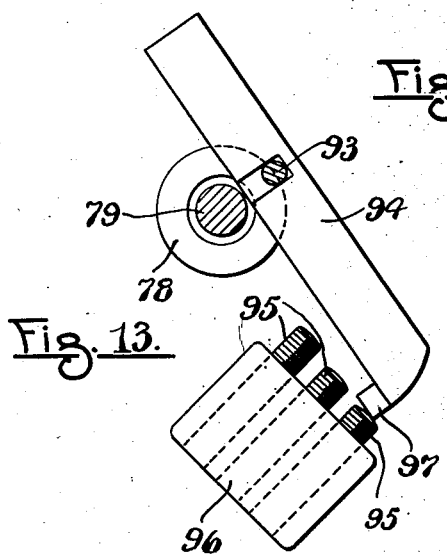
Fig. 13 is a vertical section parallel to the face of the machine and back of the first of the control levers illustrative of a detail of the construction.

The front upper portion of the collar 83 is cut away back of the plate 91. A pin 93 secured to the upper part of block 89 extends through a radial slot in the plate 91 back of said plate as shown in Fig. 11. A bar 94 located between plate 91 and the forward end of the collar 83, where it is cut away, has a slot in its under side receiving the pin 93. Said bar at one end comes to and normally engages at said end against the ends of screws 95 mounted in a block 96 therefor which is permanently secured to the face of the machine, the bar 94 having a projecting boss 97 to strike against the end of one of the pins 95 dependent upon the position to which the lever 90 has been turned. For example, as in Fig. 12, when the lever 90 is in central vertical position the boss at 97 will be so located as to come against the end of the centrally located screw 95 when the lever 84 is moved to its extreme right position. When turned to the left of central position it will be located as to come against screw 95 at the left when the lever 84 is moved to its extreme right; and similarly when turned to the right of central position it will be so located as to engage the screw 95 to the right when the lever 84 is moved to its extreme right position as shown in Fig. 13 for the control of the levers to insure the proper volume of hydraulic fluid to attain at least at any time a predetermined hydraulic pressure. It will be obvious that on manual operation of the lever at 90 the valve member 80 will be turned in correspondence with the turning movement of such lever.

Connected with the conduit or passage 98 leading to one side of the valve 31 (Fig. 3). From the conduit or passage 53 a passage 99 leads to the valve 31 at a spaced distance from the passage 98. A third passage or conduit 100 connects the passage 55—59 with the bore in which the valve 31 is mounted at still another point therein, and a fourth passage 101 connects the bore in which the valve 31 is mounted, with the chamber receiving the manually movable control valves to be later described (Fig. 3). A passage or conduit 102 has a connecting passage or conduit 103 leading to the rear part of cylinder 41 and also a passage 104 which extends between the cylinder 41 toward its front and the bore which receives the valve 57. A passage or conduit 100 is likewise connected with the cylinder 41 by a passage or conduit 105 leading to the central part of the cylinder and is connected with the bore receiving the valve 57 by a passage 104a (Fig. 3) 90° from passage 104. Two passages or conduits 106 and 107 are connected at their inner front ends with the bore in which the valves 57 is mounted and in certain positions of the valve come into conjunction with the passages 65 and 66 therein (Fig. 3). There are other passages 108 from the conduit 107 and 109 from the conduit 106 leading to the bore in which the valve 57 is mounted and which at times come into connection in with the passages 72 and 71 respectively made through said valve 57 (Fig. 4). The passage diagrammatically indicated at 110 connects the cylinder at 40 adjacent its front end with a passage 111 around the front end of valve 57 and back of plate 29 with which the passage 101 is also connected.

In addition to the various borings and passages described, in the valve 57 there are two others 112 and 113 located at right angles to each other which join at their inner ends and come to the outer surface of the valve 57 at spaced points, one at each side of the longitudinal passage at 67 (Fig. 6). Such passages 112 and 113 in a certain position of the valve 57 come into conjunction with the passages 104 and 104a respectively. Furthermore, as in Fig. 3, the passage 60 toward the rear end of valve 57 at one end and in one position of the valve (Fig. 19) joins with a passage 60a in the housing block 28 which leads to the cylinder 40 at an intermediate position of its length.

From the pumps 7 and 8 outlet pipes or conduits 114 and 115 for the liquid pumped are provided, which pipes lead to relief valve housings 116 and 117, respectively, from each of which return pipes 118 and 119 may return liquid to the tank 6. The relief valve structure will be later described, but in accordance with the conditions of operation, the liquid pumped except what, under some conditions is returned to the tank 6 will leave the valve housings 116 and 117 through the pipes 120 and 107a from the housing 116 and from the pipes 121 and 106a from the valve housing 117. The liquid forced through the pipes 120 and 121 is carried through check valve housings 122 from which conduits are joined with the single pipe or conduit 56 which delivers the liquid therein to the passages 55—59. The pipe 106a connects with the passage or conduit 106, and the pipe 107a connects with the passage 107 which have been previously described. A pressure gauge 123 is connected with the conduit 56 to give indications of hydraulic pressure during the machine operation.

Lengthwise of and underneath the table 11 (Fig. 2) two hydraulic cylinders 124 and 125 with closed ends are mounted having piston rods 126 and 127, respectively, entering the cylinders and connected with pistons therewithin, the outer ends of the rods being connected to opposite ends of the table. From the housing block 28 a pipe or conduit 128 leads to one end of the cylinder 124, the conduit at its opposite end connecting with the cylinder 40 within the block at the position shown in Figs. 2 and 3. A pipe or conduit 129 leads from the other end of the cylinder 124 back to the tank 6. Similarly a pressure pipe 130 is connected with the pressure end of the cylinder 125 and, leading to the valve housing block 28, is in connection with the cylinder 40 at the position shown in Figs. 2 and 3. An outlet or drain pipe 131 for liquid leads from the opposite end of the cylinder 125 to the tank 6. Two return or exhaust pipes 132 and 133 are connected with the valve housing block 28 in communication with the cylinder 40, the pipe 132 toward the front end of the cylinder and pipe 133 near the rear end of the cylinder, the pressure carrying pipes 128 and 130 being connected to the cylinder 40 between pipes 132 and 133 as shown.

The carriage 19 for the grinding wheel 16, and which is movable by hydraulic operation transversely of the work carried on the table 11, is connected with a movable cylinder 134 having closed ends and within which is a fixed or stationary piston 135 with tubular piston rods 136 extending one from each side of the piston and passing through the ends of the cylinder. Each of said rods adjacent the piston has liquid passing openings. As indicated at 137, said rods 136 are connected with a stationary part of the frame of the machine. Pipes or conduits 138 and 139 are connected with opposite ends of and are in conjunction with the tubular rods 136 and at their opposite ends are connected with the interior of a valve housing 140, within which a valve 141 is mounted to turn about a central axis. A pipe 142 has a telescopic connection within a larger pipe 143 and sealed against leaks which is connected with the pipe or conduit 102a, joined with the passage or conduit 102 previously described. A closing valve 144 is shown which, when it is closed, prevents any passage of liquid through the pipe 142 to the interior of the valve housing 140. A pipe 145 is connected to the housing 140 substantially diametrically opposite pipe 142, has a manually operable back pressure valve 146 therein, and has a telescopic connection with a pipe 147 which is joined with the pipe 148 leading back to the tank 6 (Fig. 2). The telescopic structures shown at 143 and 147 are to provide for the vertical adjustment of the grinding wheel with respect to the table.

Two spaced adjustable collars 149 are mounted on a rod 150 carried by the carriage 19 and in the longitudinal movements in opposite direction of cylinder 134 alternately come to a pivotally mounted lever 151, to swing said lever and, through its engagement with a handle 152 connected with the valve 141, alternately change the position of the valve 141 to cause the hydraulic pressure liquid to enter the cylinder at opposite sides and reverse the movement of said cylinder and with it the movement of the carriage 19 which mounts the grinding wheel 16. It is evident that in the position shown in Fig. 2, hydraulic pressure conducted through the pipe 142 is carried through the valve housing to the pipe 138 and thence into cylinder 134 at the right of the piston 135 causing the cylinder 134 to move to the right with an exhaust of oil at the left of the piston 135 through the pipe 139 and thence to the pipes 145—148. When the valve is turned in a clockwise direction the pressure liquid will pass from the pipe 142 through the pipe 139 to the left of the piston 135 and oil from the right of the piston will pass through pipe 138 and thence through the outlet pipe 145—148 to the tank 6.

In Fig. 14 the structure of the relief valves, the housings 116 and 117 of which have been previously noted, is shown. The description of the relief valve in connection with the housing 116 applies equally to the other valve. Said housing has a cap 153 with a valve stem guide opening 154 therein in alinement with the return pipe 118. A seating ring 155 is mounted at the interior of the housing 116 at the passage in the valve housing leading to the pipe 118. A piston valve 156 has a tubular stem extending therethrough with a conical lower end 157 seated in and closing the opening through the ring 155. The stem 158 enters the passage 154 and around it a coiled compression spring 159 is placed which normally holds the valve in the position shown in Fig. 14. The piston valve 156 is provided with a longitudinal passage 160 connecting the interior space of the valve between the pipes 114 and 120 with the cylindrical chamber between the valve and cap 153. The cap 153 has a passage 161 in communication with the conduit 107a which passage leads to a chamber, the passage being normally closed by a valve 163 in the chamber yieldingly held in place by a spring 164, the tension of which may be adjusted by a screw 165 mounted as shown in Fig. 14.

Operation

The driving of pumps 7 and 8 forces liquid either from one or both of them through the pipe or conduit 56, which is a primary pressure line of liquid delivered into the passages 55—59 (Fig. 7) and to the transverse passage 60. A reference to Figs. 17, 18 and 19 shows that the passage 60 is closed against flow of oil therethrough except in one position of the valve member 57 which it has when the lever 84 for turning the valve is moved to the right of its central position, as in Fig. 10. The oil under such pressure with the piston sections 43, 43a and 43b as in Fig. 2, enters the cylinder 40 between the piston sections 43a and 43b and, through the pipe 130 passes to the cylinder 125 forcing the piston therein to the right (Fig. 2) and moving the table 11 in the same direction, the oil or other hydraulic liquid which may have leaked ahead of the piston being forced out through pipe 131 and delivered to the tank 6. The piston in the cylinder 124 is likewise forced to the right and oil which has been previously pumped therein against said piston is forced out through the pipe 128, enters the space between piston sections 43 and 43a and is forced out and returns to the tank through the pipe 133.

Part of the oil under pressure in the passage 55—59 passes into and through the passage 100 to the valve at 31 passing through its passage 32 to the conduit 99 and thence to the passage 53 to enter the front ends of both cylinders 40 and 41 and move the pistons therein to the rear. This is the first effect when the valve 31 which previously had been in the position shown in Fig. 3 is turned to the position in Fig. 2, to thereby move said pistons from their position in Fig. 3 to that in Fig. 2, and connect the pipe 130 with the passage at 60a to furnish oil to the cylinder 125 to move the table 11 in a direction reverse to which it had been previously moved. And of course it is to be understood that the turning of the valve 31 is, as has previously been described, by a finger 38 (Fig. 7) engaging against the lug 37 with a turning of the valve about its vertical axis.

When the table 11 reaches its predetermined position of movement in a direction to the right (Fig. 2) the other of said fingers 38 engages the lug 37 and turns the valve to the position shown in Fig. 3 causing a reverse movement of the table through forcing oil into the right hand end of the cylinder 124 through the pipe 128. The pistons within the cylinders 40 and 41 are moved forwardly from the position in Fig. 2 to that in Fig. 3 when valve 31 is turned as in Fig. 3, there being a flow of oil from passage 100 through the valve passage 32 (Fig. 3) and through passage 98 to the passage 51 and thence to the rear ends of the cylinders 40 and 41. Thereupon the pipe 128 is brought into communication with the passage 60a and oil flows through cylinder 40, between piston sections 43 and 43a to the pipe 128 and thence to the right hand end of cylinder 124. Oil or other hydraulic liquid which has seeped by the piston 124 is returned to the tank 6 through the pipe 129. The movement of the piston within the cylinder 125 to the left forces oil outwardly through the pipe 130 and into the cylinder 40 between piston sections 43a and 43b and thence through the return pipe 132 to the tank 6.

In the movements of the pistons within cylinders 40 and 41 as for example, form the position in Fig. 2 to that in Fig. 3, the oil or other hydraulic liquid in front of the piston sections 43b and 44b must have passage outwardly. This is provided by said oil following the passage 53 and thence the passage 99 (Fig. 3) through the side recess in the valve to the passage 101 and thence through the annular space indicated at 111 to the passage 110 to cylinder 40 and to the tank 6 through the return pipe 132. When on the other hand upon a reversal of position of the valve 31 at the end of a table reciprocation, the valve being turned to the position shown in Fig. 2, the oil or other liquid at the rear ends of the cylinders 40 and 41 is forced out through the passage 51 thence through the passage 98 to the valve 31 (Fig. 2), through the lower valve passage 33 and therefrom through the passages 101, 111, 110 and the return pipe 132 to the tank.

Thus with the structure described and with the hand lever 84 at its position to the right (Fig. 10) the valve member 57 being located as in Fig. 19, the work table 11 is reciprocated and stopped and reversed in movement at each end of a reciprocatory movement wholly by hydraulic pressure. It is of course to be understood that if the full volume of the liquid pumped by both pumps 7 and 8 is supplied through the pipe or conduit 56 and delivered to the passages 55, 59, the speed of movement of the table is at its maximum. The control of the volume of liquid which is doing the work of moving the table 11 will hereafter be described.

Referring to the cylinders 41 and 42, as has been previously described, the piston which has the three spaced sections, 44, 44a and 44b in cylinder 41 is moved from front to rear and back from rear to the front simultaneously with the like movements of the cylinder 40. When the piston within the cylinder 41 is moved to its forward position (Fig. 3) the passage 105 connecting to the passage at 100, which is always directly connected to the main pressure line of the liquid, is opened and liquid flows into cylinder 41 between the piston sections 44 and 44a, and passes therefrom through the passage at 49 to the rear end of cylinder 42 and moves the piston 45 forward until it hits the end of screw 47 the cylinder back of piston 45 filling with liquid. In such movement the liquid which has been previously forced into the cylinder ahead of or in front of piston 45 is forced out through the passage at 50 to cylinder 41 between the piston sections 44a and 44b, thence through the passages 104 and 102 to deliver the oil into the pipe or conduit 102a connected with the pipe 142 (Fig. 2), and thence through the pipes 138 or 139, depending upon the position of valve 141, into cylinder 134 to one side of piston 135. The quantity of the oil or other hydraulic liquid which is thus forced from cylinder 42 to cylinder 134 is governed by the adjusted distance between the screws 46 and 47. Accordingly when said screws are adjusted closer together than shown in Fig. 2 or 3, the quantity of hydraulic liquid delivered into the cylinder 134 will be lessened and the extent of movement of said cylinder correspondingly decreased. Such adjustment by turning the hand wheel at 48 for a greater or less quantity of liquid to be delivered to the cylinder 134 governs the extent of the cross feed movement of the grinding wheel 16 transverse of the table 11 and the work thereon. It is evident that with this construction there is a limited, or a step by step movement of the grinding wheel transverse of the table at the beginning (or end) of each reciprocatory movement of the table. This continues until there has been sufficient movement one way or the other to bring the reversing mechanism for the valve 141 into play, whereupon the periodic step by step transverse feed of the grinding wheel is changed to an opposite or reverse direction. Thus if the feed of the grinding wheel has been forward in periodic short steps of movement between table reciprocations, after the automatic change of the valve 141 has taken place, such step by step periodic cross feed movement is then to the rear until reversal of the valve 141 again occurs.

It is to be noted that such intermittent or periodic step by step feeding of the grinding wheel occurs when the passages 104 and 104a are not in conjunction with the passages 113 and 112 in the valve member 57. If such passages are in conjunction, as shown in Fig. 26, the oil under pressure under such circumstances will pass into and through the passage 100, thence through the passage 104a and through the passages 112 and 113 to passage 104 connecting with the conduit 102, from which it passes to pipe 102a and there will be a continuous flow of liquid under pressure to the cylinder 134 with a continuous reciprocatory movement of said cylinder 134 with reversals in movement by the automatic change of the valve 141, and the grinding wheel will move bodily forward, to the rear and again forward so long as this conjunction of passages 104 and 104a with passages 112 and 113 continuous.

It will be noted with reference to Fig. 26, that when such conjunction of the passages 104, 104a, 112 and 113 occurs, the valve member 57 has been turned counter-clockwise to its farthest position to the left the control handle 84 for such valve being moved as in Fig. 8. As previously described, with reference to Figs. 17, 18 and 19, when such control handle 84 and the valve member 57 connected thereto are turned to the farthermost positions to the left there is no passage of the hydraulic liquid form the passage 59 to the passage 60a, and the cylinder 40, therefore the table 11 stands still. This provides for the condition or situation for dressing implement or tool upon the table 11 and moving the grinding wheel back and forth across the immediate dressing diamond with the wheel rotating during such movement.

Furthermore with reference to Figs. 27 and 28, which show the valve member 57 respectively at central and to the right positions, the conjunction of passages 112 and 113 in the valve member 57 with the passages 104 and 104a is broken. From the foregoing it will be evident that when the control lever 84 and the valve 57 connected therewith are turned to the right of the intermediate central position the work table 11 is simultaneously reciprocated with a cross feed of the grinding wheel in periodic step by step movements between successive reciprocatory movements of the table; and that the extent of the cross feed of the grinding wheel is governed by the extent of travel of piston 45 between the abutments 46 and 47. And when the manual control lever 84 and the valve member 57 connected therewith are turned to the left of central position, the work holding table 11 remains stationary and the grinding wheel is reciprocated transverse to the length of the table.

When the control lever 84 and the valve 57 connected therewith are at central position, as in Fig. 18, the movements of the table and of the grinding wheel cross feed are both stopped, there being no provision for getting pressure liquid from the pumps to the pressure end of either of the cylinders 124 or 125 which control the movement of the table, or to the cylinder 134, the movement of which controls the transverse or cross feed movement of the grinding wheel. Under such conditions however the pumps 7 and 8 may be continuously driven and pump oil or other hydraulic liquid used, but which will be returned to the tank 6.

Referring to Figs. 20, 21 and 22 the passage at 72 connected by the groove 73 with the passage 108 joins the passage 67 with passage 107 and the conduit 107a connected with the relief valve at 116 for the larger pump. Such connection occurs when the valve 57 is in the positions shown in Figs. 20 and 21 but is broken when the valve is in the position shown in Fig. 22. In the relief valve structure as shown in Fig. 14 the oil pumped from the larger pump through pipe 114 will pass through the conduit 120 to the passages 55—59, 60 and 60a with the valve 57 in the positions shown in Figs. 19 and 22 but is cut off from the passage 60a when the valve is as shown in Figs. 17 and 18. But in that case the oil or the hydraulic liquid following the passage 160 in the valve 156 into the cylindrical chamber above the valve, delivers oil to the conduit 107a and passage 107, thence through the passages 108, 73 and 72 to the passage 67 and (Fig. 7) is returned to the tank through the passages 110, 111, the cylinder 40 and return pipe 132.

If the quantity of liquid pumped is too great to pass through these passages or any one of them, the development of high pressure against the ball valve 163 forces it back and the liquid pumped in part at least returns to the passage 154 through the tubular stem 158 and the tank return pipe 118. Also under conditions of pressure in excess of that for which the spring has been adjusted will cause a compression of the spring and a lift of the piston valve 156 with a direct flow of the liquid from the pipe 114 through the ring 155 to return through the pipe 118. Thus, so far as the larger pump is concerned, it is taken care of when the valve 57 is at the central position by the connection of passage 108 with the passage 67 and, similarly, is taken care of by such passage connection when the valve is turned to its farthest to the left position as in Fig. 20.

The liquid from the smaller pump which passes through the relief valve structure at 117 (like the valve 116 in Fig. 14) at the central position of valve 57, or as in Fig. 24 is carried in whole or in part to the passage 109 which branches from the passage 106, and through the passage 71 to said passage 67 and returned to the tank, in the same manner as described, through the pipe 132. But with the valve 57 at either of the other two positions shown in Figs. 23 and 25 passages 71 and 109 do not come into conjunction and the oil from the smaller pump 8 when the valve 57 is in the position of Figs. 17, 20, 23 and 26 cannot, any part of it, be delivered through the pipe 106a but goes as much as is needed to the pipe 56, passages 55 and 59 and 100 and follows the path shown in Fig. 26 through the various passages 104a, 112, 113, 104, and 102 and conduit 102a, pipe 142 to the valve housing 140 for operating the cylinder 134. And of course the relief valve at 117 operates the same as the relief valve at 116 upon the hydraulic pressure reaching or exceeding a predetermined amount.

From what has been described of the operation thus far, it is evident that the hydraulic operation of the table 11 takes place only when valve 57 has been moved to its farthest to right position upon a corresponding manual operation of the lever 84 to a like position shown in Fig. 19; and that as shown in Figs. 22, 25 and 28, so far as the valve 57 is concerned, the liquid pumped by the larger pump 7 is returned to the tank 6. During such operation the relief valves for the pumps function under any conditions of reaching excess pressure. At the central position, so far as the valve 57 is concerned, there is no operation of either table or cross feed of the grinding wheel; and at the left hand position indicated in Fig. 8 the table is not moved but the reciprocatory cross feed movement of the grinding wheel is contiguous. Furthermore, at the central position oil pumped by the larger pump is returned to the tank (Fig. 21) as it is also at the left position (Fig. 20). The liquid from the smaller pump is returned to the tank (Fig. 24) with valve 57 at central position; but at the position of the valve to the left (Fig. 23) the smaller pump supplies liquid under pressure to operate cylinder 134 continuously, the liquid pumped thereby passing in part of its travel through the passages 112 and 113 (Fig. 26).

What has been previously described with respect to the valve 57 and its three normal positions to which moved shown in Figs. 8, 9 and 10 as left, central and right positions, has been upon the assumption that the valve 80 has moved with the valve 57 as though connected therewith, the relations of such valves 57 and 80 to each other not being disturbed. But from previous description it is evident that liquid carried through pipes 106a and 107a to passages 106 and 107 respectively, may in part at least be carried through the passages 65 and 66 (Fig. 4), or through the passages 81 and 82 in the valve 80 and thus oil be delivered to the passage 67 for return, as previously described, through the several passages 111, 110, cylinder 40 and the conduit 132 to the tank. In Figs. 29 to 37 inclusive are shown various relative positions of valves 57 and 80 to each other and of the valve 57 to its housing block 28 and the passages therein. For example, in Figs. 29, 30 and 31 the passage 107 connected with conduit 107a leading eventually from the larger pump 7 communicates with the passage 67 in all three positions of the valve 57, whether to the right, at the right, at the center or to the left with the valve 81 disposed to connect the passages 66 and 69. This provides for a circulation of oil in part at least from the larger pump to the tank without its doing work in connection with either of the operating cylinders for the table or the grinding wheel cross feed. In all of the other Figures, 32 to 37 inclusive, irrespective of the position of the valve 57, oil passage through the passages 66, 81 and 69 to the passage 67 is cut off; and in all of such positions the cutting out of the larger pump does not occur. It is these nine positions, shown in Figs. 29 to 37, inclusive which the valves may take with respect to each other and to the valve housing block 28 which govern the selective control of the larger pump 7.

In Figs. 38 to 46 inclusive are illustrations of nine relative positions of the two valves 57 and 80 and of the housing valve block 28 to each other which govern selective control of the smaller pump 8. It will be noted in Figs. 41, 42 and 43 the passage 82 through the valve 80 is in conjunction with and joins passages 65 and 70 and that in Figs. 42 and 43 there is a connection of the passage 65 with the passage 106 which, through the conduit or pipe 106a, is connected with the relief valve structure 117 for the smaller pump 8; therefore, in such positions liquid pumped by the smaller pump and which passes through the conduit 106a is returned to the tank by being carried to the passage 67 and thence outwardly through the previously described course of movement for the oil to the return pipe 132.

Without going into specific detail and following the course, under all of the conditions represented, of the liquid, ordinarily oil which is used, with this invention the table may be driven in its reciprocatory movements from the oil pumped by either one or both of the pumps, or it may be stopped without movement by moving both control valves 57 and 80 to central position. The speed of movement of the table is therefore controllable between no movement through all increasing speeds of movement to the maximum. While the levers 84 and 90, by which the valves 57 and 80 may be manually moved with relation to each other are, in general, concerned with three normal positions for each, it is evident that they can be stopped at positions between the three normal positions for each and every gradation of speed between maximum and minimum obtained. At the maximum speed of operation of the table of course both pumps will be doing useful work in conjunction with moving the table. At somewhat lower speeds the smaller pump may be cut out and rendered ineffective, and at still lower speeds the larger pump made ineffective, and the smaller pump made effective for such work. Simultaneously with the reciprocating movement of the table the grinding wheel may be fed across the table or work thereon in step by step movements between reciprocatory movements of the table, and in greater or less amounts. Obviously this cross feed may be made ineffective by closing the valve at 144 so that no hydraulic pressure can be supplied the cylinder 134. And finally the continuous transverse or cross movement of the grinding wheel relative to the table may be had with the table at rest and with the smaller pump furnishing the pressure liquid for such operation.

This construction of hydraulically operated mechanism, primarily for surface grinding machines, but not necessarily restricted thereto, is one very convenient to operate. Both of the control levers 84 and 90 are located in close proximity to each other substantially midway between the ends of the machine at the front to be directly available for the operator to manipulate. Likewise the degree or amount of the cross feed movement of the grinding wheel is controlled by the manually operable wheel at 48 (Fig. 2) directly accessible to the operator at his normal position in front of the machine. It is of course to be understood that with all of the hydraulic structures described, in connection with the passages and cylinders, the usual tapered leads to the passages are provided and the piston sections within the cylinder 40 are slightly tapered where necessary to avoid abrupt cuttings off of liquid flow, which would cause an accompanying jar or hammer and the development of momentary undesired excessive pressures. This machine has been built and reduced to practice and operated in an exceptionally satisfactory manner. Such mechanism is particularly desirable in service and not liable to get out of order.

The invention is defined in the appended claims and is to be considered comprehensive of all forms of structure coming within their scope.

I claim:

1. In a machine having a reciprocable table and piston cylinder means connected with said table for supplying hydraulic liquid thereto to reciprocate the table, of two continuously driven pumps for supplying hydraulic liquid under pressure, conduit means interposed between said pumps and said piston cylinder means for carrying the pumped liquid, and manually operable control means located in said conduit means between said pumps and piston cylinder means for controlling liquid under pressure supplied to said piston cylinder means, said manually operable control means being movable between a neutral position in which no liquid is supplied to said piston cylinder means and an extreme position away from the first position in which a maximum amount of said liquid is thus supplied, said manual control means comprising two manually operable elements, one of which when moved away from neutral position toward said extreme position opens a passage in said conduit means of progressively increasing area the farther said element is moved from neutral position toward its extreme position, to permit the passage of selectively controlled volumes of liquid under pressure to said piston cylinder means, and the other having means for controlling the passage of liquid pumped from the pumps to and through said conduit means, whereby liquid pressure to the piston cylinder means may be selectively controlled to supply liquid thereto from either of said pumps or both of them, combined with relief means for each of said pumps, automatically liquid pressure operated for returning liquid pumped to the liquid source supply from either or both of said pumps which, through said control means, has the liquid pumped therefrom diverted from going to said piston cylinder means.

2. A construction containing the elements in combination defined in claim 1, said manually operable control means being located at the front and substantially at a central position between the ends of the reciprocable table, and each of said control means having a handle thereon for manual operation disposed in readily accessible position in front of and below the table.

3. A construction containing the elements in combination defined in claim 1, said manually operable control means comprising two cylindrical members with liquid passages therethrough for conjunction with passages in said conduit means, one of said cylindrical members being disposed within the other and both turnable about a common axis.

4. A construction as defined in claim 1, said manual control means comprising two cylindrical members, one located within a cylindrical recess at the outer end of the other and said cylindrical members being turnable about a common axis, a sleeve extending from the larger of said cylindrical members and in front of and below the table, a rod extending from the other of the control members through said sleeve, a generally radially extending lever secured at the front end of said rod, and a lever pivotally mounted at the front end of said sleeve, the body of the machine immediately in front of said handle having a recess to receive a portion of said last mentioned lever when at neutral position.

5. A construction containing the elements in combination defined in claim 1, said manual control means comprising two cylindrical members, one smaller than the other and seated in a recess in the front end of the larger member, a sleeve extending forwardly from the larger member and a rod extending forwardly from the smaller member through said sleeve, a generally radially extending lever connected at the front end of the rod, a pivotally mounted lever extending radially therefrom, at the front end of the sleeve, the body of the machine having a recess to receive a part of said last mentioned lever at the neutral position, and a means at the front end of said rod connected and movable therewith in the turning movements of said rod cooperating with stops on the sleeve for limiting the independent movements of the smaller of said cylindrical control elements with reference to the movements of the larger of said cylindrical control elements.

6. A construction having the elements in combination defined in claim 1, combined with a reciprocable carriage for a rotatably mounted grinding wheel mounted above said table and reciprocable transverse of its length, hydraulic piston cylinder means connected with and adapted to reciprocate said grinding wheel carriage, conduit means leading to said piston cylinder means, and means for supplying liquid to said last mentioned conduit means by normally moving the control means away from its neutral position in a direction opposite which it is moved for controlling liquid supplied to the piston cylinder means actuating the reciprocable table.

7. A machine having a horizontal reciprocably mounted table, hydraulically operated actuating means connected with the table for reciprocating it, two continuously driven pumps having a source of liquid supply with which the pumps are connected for continuously pumping liquid, conduit means between the pumps and said table actuating means for conducting liquid under pressure pumped to said actuating means, a control unit having a body mounted at the front of the machine below the table and interposed in said conduit means, two manually operable control members movably mounted on said control unit and extending forward therefrom, each having a manually engageable means at its front end for independent operation, each of said members having passages therethrough and the body of the control unit having passages in cooperative relation therewith and to the conduit means whereby the quantity of liquid passing to said table actuating means is controllable between none passing to a passing of substantially all of the liquid pumped by said pumps by manual operation of one of said control members, and control of liquid pumped by either of said pumps and passing to said table actuating means is by manual actuation of the other of said manually operable members.

8. A construction containing the elements in combination defined in claim 7, combined with a reversal valve mounted on said control unit body and adapted to be operated by said table substantially at the ends of its reciprocatory movements, said control unit body having passages for liquid pumped in association with said valve for changing the passage flow of the liquid pumped upon movement of the valve imparted thereto by said table to direct the flow of liquid to cause reversal of movement of the table.

9. A machine having the elements in combination defined in claim 7, combined with means for controlling said manually operable members in their movements with respect to each other to insure maintenance of a predetermined minimum pressure of liquid pumped to the hydraulically operated actuating means for reciprocating the table.

10. A machine having a horizontal reciprocably mounted table, hydraulically operated actuating means connecting with the table for reciprocating it, two continuously driven pumps having a source of liquid supply with which the pumps are connected for continuously pumping liquid, conduit means between the pumps and said table actuating means for conducting liquid pumped under pressure to said actuating means, a control unit including a body and two manually operable control members mounted therein to be turned about a common axis, a handle at the front end of each of said members for independent manual operation, each of said members having passages therethrough and the body of the control unit having passages in cooperative relation therewith and to the conduit means, whereby the quantity of liquid passed to said table actuating means is controllable from none passing to substantially all of the liquid pumped by said pumps, by manual operation of one of said control members, and control of liquid pumped by either of said pumps and passing to said table actuating means being controlled by manual actuation of the other of said control members, and stop means connected and movable with said last mentioned control member preventing operation thereof so as to reduce the quantity of liquid pumped and carried to said hydraulically operated table actuating means and maintaining the pressure of the liquid at or above a predetermined minimum pressure.

MARTIN DE YOUNG.